United States Patent
Roh (10) Patent No.: US 10,701,170 B2
(45) Date of Patent: Jun. 30, 2020

(54) MULTICASTING METHOD IN DISTRIBUTED CACHE ENVIRONMENT, AND DISTRIBUTED CACHE SERVER USING THE SAME

(71) Applicant: TMAXSOFT. CO., LTD., Gyeonggi-do (KR)

(72) Inventor: Cliff Roh, Gyeonggi-do (KR)

(73) Assignee: TMAXSOFT. CO., LTD., Gyeonggi-do (KR)

( * ) Notice: Subject to any disclaimer, the term of this patent is extended or adjusted under 35 U.S.C. 154(b) by 73 days.

(21) Appl. No.: 16/012,098

(22) Filed: Jun. 19, 2018

(65) Prior Publication Data

US 2019/0379758 A1 Dec. 12, 2019

(30) Foreign Application Priority Data

Jun. 7, 2018 (KR) .................. 10-2018-0065708

(51) Int. Cl.
*H04L 29/08* (2006.01)
*H04L 5/00* (2006.01)
*H04L 1/18* (2006.01)
*H04L 29/06* (2006.01)

(52) U.S. Cl.
CPC ........ *H04L 67/2842* (2013.01); *H04L 1/1861* (2013.01); *H04L 5/0055* (2013.01); *H04L 65/4076* (2013.01)

(58) Field of Classification Search
USPC ........................................ 709/203
See application file for complete search history.

(56) References Cited

U.S. PATENT DOCUMENTS

| 6,269,085 | B1 * | 7/2001 | Provino | H04L 12/185 370/229 |
| 6,505,253 | B1 * | 1/2003 | Chiu | H04L 12/1868 370/229 |
| 2006/0256740 | A1 * | 11/2006 | Koski | H04L 1/1854 370/278 |
| 2016/0218833 | A1 * | 7/2016 | Sapio | H04L 1/1628 |

* cited by examiner

*Primary Examiner* — Hermon Asres
(74) *Attorney, Agent, or Firm* — Husch Blackwell LLP (57) ABSTRACT

A multicasting method in a distributed cache environment is provided. The multicasting method includes steps of: (a) a specific distributed cache server among a plurality of distributed cache servers in the distributed cache environment, transmitting certain messages to client nodes including at least one another distributed cache server among the plurality of distributed cache servers in the distributed cache environment through multicast and then sequentially registering, in an unacknowledged message map, UNACK messages representing messages without their corresponding ACK messages from their corresponding client nodes among the certain messages; and (b) the specific distributed cache server checking the number of the UNACK messages registered in the unacknowledged message map and, if the number reaches a first predetermined number, stopping transmission of additional messages to the client nodes through the multicast.

12 Claims, 7 Drawing Sheets

MULTICASTING METHOD IN DISTRIBUTED CACHE ENVIRONMENT, AND DISTRIBUTED CACHE SERVER USING THE SAME

CROSS REFERENCE TO RELATED APPLICATION

This application claims priority to and incorporates herein by reference all disclosure in Korean patent application no. 10-2018-0065708 filed Jun. 7, 2018.

FIELD OF THE INVENTION

The present invention relates to a multicasting method in a distributed cache environment; and more particularly, to the multicasting method in the distributed cache environment, including steps of (a) a specific distributed cache server among a plurality of distributed cache servers in the distributed cache environment, transmitting certain messages to client nodes including at least one another distributed cache server among the plurality of distributed cache servers in the distributed cache environment through multicast and then sequentially registering, in an unacknowledged message map, UNACK messages representing messages without their corresponding ACK messages from their corresponding client nodes among the certain messages, and (b) the specific distributed cache server checking the number of the UNACK messages registered in the unacknowledged message map and, if the number reaches a first predetermined number, stopping transmission of additional messages to the client nodes through the multicast, and the distributed cache server using the same.

BACKGROUND OF THE INVENTION

With the recent growth of social media such as Facebook, YouTube, Twitter, and the proliferation of digital devices such as mobile devices, users are no longer simple data consumers, but play roles of data producers. As such, the amount of data has rapidly increased and the types of data have become diversified, which has led us to a big data era. In order to process such big data, distributed storage management technologies such as Hadoop and parallel database management system (DBMS) are currently utilized.

In general, the distributed storage management technologies are required to store and process data in storages. Hence, costs due to low speed of I/O may increase and bottlenecks may be generated in the nodes. In order to solve these problems, distributed cache technologies of storing cache data in a plurality of distributed cache servers are currently used as a means for providing reliable, low-cost data storing scheme in cloud infrastructure.

According to the distributed cache technologies, a multicast-based communication protocol is used to control cache data, etc., and reliability must be guaranteed in processing cache data distributed over the network faster and more efficiently.

However, multicast technologies for enhancing a reliability have been studied and used in many fields until now, but there is a problem that it is difficult to guarantee a reliability of multicast in a distributed cache environment.

Since multicast is a process based on a large number of receivers, acknowledgments (ACK) from the receivers are required to guarantee as much reliability as TCP communications.

However, since the acknowledgments from the large number of the receivers must be managed, if an efficient algorithm is not used, side effects such as excessive network load, consumption of CPU and memory resources during acknowledgment processes, and long response time due to them may be generated.

SUMMARY OF THE INVENTION

It is an object of the present invention to solve all the aforementioned problems.

It is another object of the present invention to improve a reliability of multicast in a distributed environment.

It is still another object of the present invention to allow quick and stable cache data control based on a multicast protocol in the distributed environment.

It is still yet another object of the present invention to minimize the number of transmission of ACK messages in the distributed environment.

In accordance with one aspect of the present invention, there is provided a multicasting method in a distributed cache environment, including steps of: (a) a specific distributed cache server among a plurality of distributed cache servers in the distributed cache environment, transmitting certain messages to client nodes including at least one another distributed cache server among the plurality of distributed cache servers in the distributed cache environment through multicast and then sequentially registering, in an unacknowledged message map, UNACK messages representing messages without their corresponding ACK messages from their corresponding client nodes among the certain messages; and (b) the specific distributed cache server checking the number of the UNACK messages registered in the unacknowledged message map and, if the number reaches a first predetermined number, stopping transmission of additional messages to the client nodes through the multicast.

In accordance with another aspect of the present invention, there is provided a multicasting method in a distributed cache environment, including steps of: (a) a specific distributed cache server among a plurality of distributed cache servers in the distributed cache environment, obtaining certain messages transmitted from client nodes including at least one another distributed cache server among the plurality of distributed cache servers in the distributed cache environment through multicast and then sequentially registering ACK messages for transmitting a confirmation as to a reception of the certain messages to the client nodes in their corresponding ACK message queues and managing the registered ACK messages; and (b) the specific distributed cache server (i) identifying each of specific ACK messages having each largest message number for each of the client nodes among ACK messages registered in each of the ACK message queues and (ii) transmitting each of the identified specific ACK messages to each of the corresponding client nodes and automatically determining that at least part of ACK messages, in each of the ACK message queues corresponding to each of the client nodes, having a message number smaller than each message number of each of the specific ACK messages have been confirmed.

In accordance with still another aspect of the present invention, there is provided a specific distributed cache server for performing multicast in a distributed cache environment, including: a communication part for transmitting certain messages to client nodes including at least one another distributed cache server among the plurality of distributed cache servers in the distributed cache environment through the multicast; and a processor for performing processes of (I) sequentially registering, in an unacknowledged message map, UNACK messages representing messages without their corresponding ACK messages from their corresponding client nodes among the certain messages; and (II) checking the number of the UNACK messages registered in the unacknowledged message map and, if the number reaches a first predetermined number, stopping transmission of additional messages to the client nodes through the multicast.

In accordance with still yet another aspect of the present invention, there is provided a specific distributed cache server for performing a multicast method in a distributed cache environment, including: a communication part for obtaining certain messages transmitted from client nodes including at least one another distributed cache server among the plurality of distributed cache servers in the distributed cache environment through the multicast; and a processor for performing processes of (I) sequentially registering ACK messages for transmitting a confirmation as to a reception of the certain messages to the client nodes in their corresponding ACK message queues and managing the registered ACK messages; and (II) (i) identifying each of specific ACK messages having each largest message number for each of the client nodes among ACK messages registered in each of the ACK message queues and (ii) transmitting each of the identified specific ACK messages to each of the corresponding client nodes and automatically determining that at least part of ACK messages, in each of the ACK message queues corresponding to each of the client nodes, having a message number smaller than each message number of each of the specific ACK messages have been confirmed.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make it easy for those who have common knowledge in the art to which the present invention pertains to implement the present invention, detailed explanation on desirable embodiment examples of the present invention will be made by referring to attached drawings.

Figure 1:
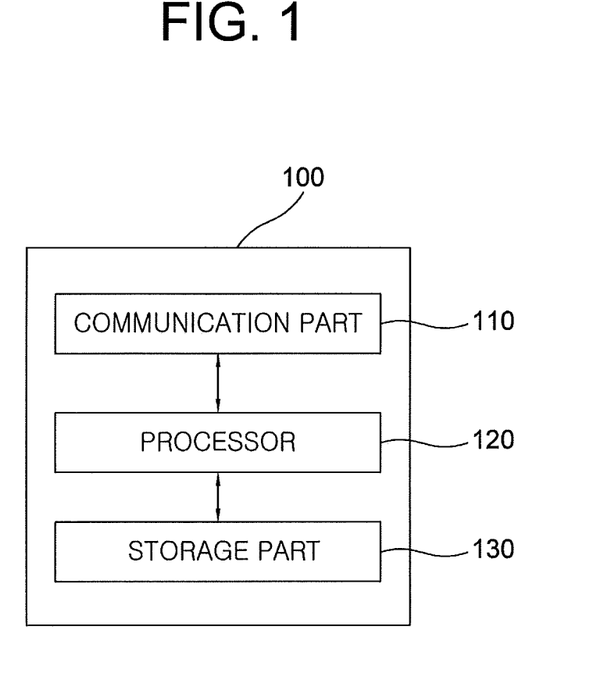
FIG. 1 is a diagram schematically illustrating a distributed cache server multicasting in a distributed cache environment in accordance with one example embodiment of the present invention.

FIG. 1 is a diagram schematically illustrating a distributed cache server multicasting in a distributed cache environment in accordance with one example embodiment of the present invention.

Referring to FIG. 1, a distributed cache server 100 may include a communication unit 100, a processor 120 and a storage part 130.

First, the communication part 110 allows various data to be transmitted or received. In detail, the communication part 110 may transmit messages to client nodes including at least one another distributed cache server through multicast or obtain messages transmitted from the client nodes through the multicast.

Next, the processor 120 allows the various data to be processed. In detail, the processor 120 is configured to control cache data based on fast and stable multicast protocol through functions of minimization of ACK messages, adaptive retransmission, simultaneous transmission of a multicast instruction message and an ACK message, etc. in order to minimize side effects such as excessive network load due to multicast in a distributed cache environment, consumption of computer resources at the time of processing the ACK message, a delay of the response due to the consumption thereof, etc.

Next, the storage part 130 stores various data. For example, the storage part 130 may store instructions for operation of the processor 120 and cache data in a distributed environment.

It was explained above that the distributed cache server 100 transmits/receives a certain message to/from one of a plurality of distributed cache servers, but it is possible to configure the whole system by including one distributed cache server for transmitting a certain message and another distributed cache server for receiving a certain message.

Figure 2:
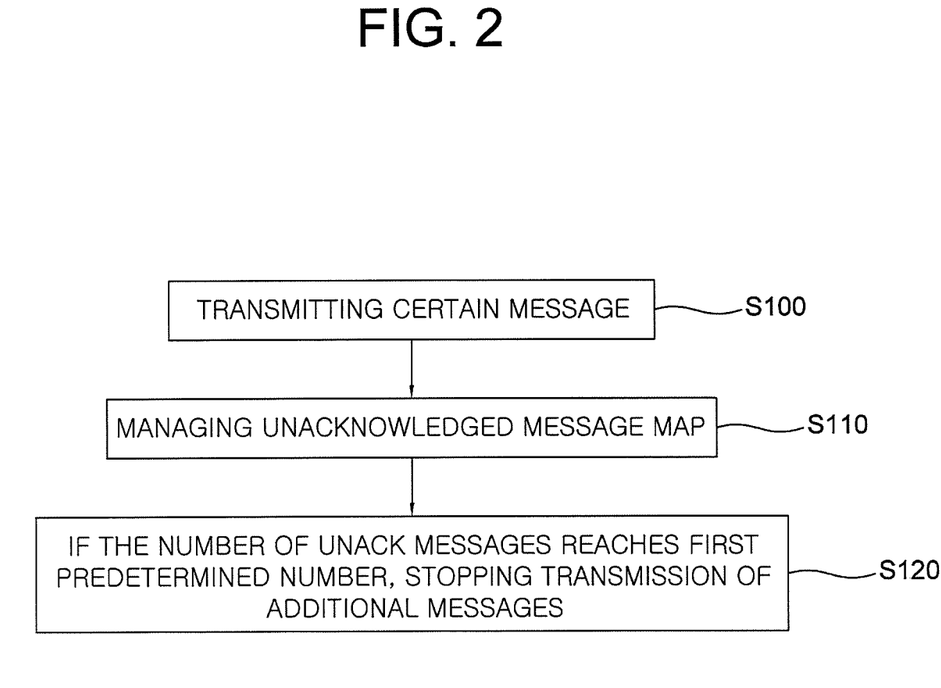
FIG. 2 is a diagram schematically illustrating a multicasting method in the distributed cache environment in accordance with one example embodiment of the present invention.

The multicasting method in the distributed cache environment in accordance with one example embodiment of the present invention through the distributed cache server 100 is explained by referring to FIG. 2 as follows.

First, the processor 120 of a specific distributed cache server 100 among the plurality of distributed cache servers in the distributed cache environment transmits a certain message to client nodes including at least one another distributed cache server by the multicasting method through the communication part 110 at a step of S100. Herein, the certain message may be a control command for cache data in the distributed cache environment, but it is not limited thereto. The control command for the cache data may include a control command for controlling cluster member, a control command for invalidating cache entry, a control command according to an instruction to perform a parallel process, etc.

Next, the specific distributed cache server 100 registers, in an unacknowledged message map, UNACK (unacknowledged) messages representing messages without their corresponding ACK messages from their corresponding client nodes among all the messages transmitted by the specific distributed cache server 100, and manages the unacknowledged message map at a step of S110.

Thereafter, the specific distributed cache server 100 checks the number of the UNACK messages registered in the unacknowledged message map and, if the number reaches a first predetermined number, stops a transmission of additional messages to the client nodes through the multicast at a step of S120.

For example, on condition that the network process is delayed, if a large amount of cache data is requested by user applications, i.e., client nodes, the unacknowledged message map has a problem in that it becomes large, and as the UNACK messages increase, another problem may be also generated in that a possibility of retransmitting the UNACK messages increases. Hence, the specific distributed cache server 100 manages information on a size of the unacknowledged message map and, when the size of the unacknowledged message map exceeds a maximum threshold value, determines the process as delayed and thus stops additional generation of multicast network operations.

Thereafter, if the number of UNACK messages of the unacknowledged message map becomes equal to or smaller than a second predetermined number, generation of the multicast network operations is resumed.

Meanwhile, the specific distributed cache server 100, if receiving a specific ACK message from one of client nodes, checks whether the unacknowledged message map includes a specific UNACK message corresponding to the specific ACK message among the UNACK messages and, if the unacknowledged message map is determined as including the specific UNACK message, deletes the specific UNACK message from the unacknowledged message map.

Herein, the specific distributed cache server 100 deletes at least part of UNACK messages, in the unacknowledged message map, which correspond to at least part of ACK messages having a number smaller than the number of the specific ACK message corresponding to the specific UNACK message.

Figure 3:
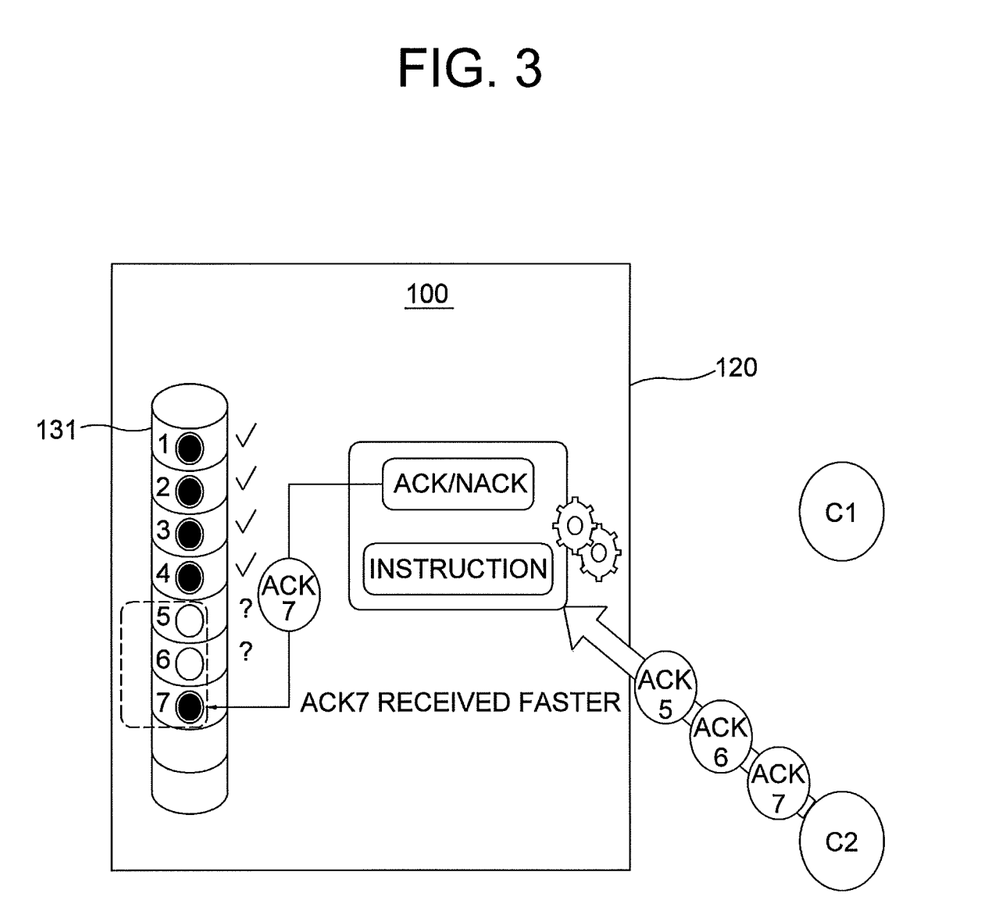
FIG. 3 is a diagram schematically illustrating a process of a multicasting method which manages UNACK messages registered in an unacknowledged message map in the distributed cache environment in accordance with one example embodiment of the present invention.

For example, referring to FIG. 3, on condition that UACK messages UACK1 to UACK4 in the unacknowledged message map 131 corresponding to the client node C2 have been acknowledged by using their corresponding ACK messages ACK1 to ACK4, if an ACK message ACK7 is received before ACK messages ACK5 and ACK6 are received from the client node C2, the specific distributed cache server 100 automatically determines that UACK5 and UACK6 have been acknowledged by using their corresponding ACK messages ACK5 and ACK6. Herein, "automatically determines" represents that it regards the UACK5 and the UNACK6 as acknowledged without having to an additional process for acknowledging them. In FIG. 3, only the client C2 is considered but a plurality of client nodes can also be considered. That is, the specific distributed cache server 100 may manage respective UNACK messages registered in respective unacknowledged maps for the respective client nodes by using the above-described method.

Further, the specific distributed cache server 100 checks whether to retransmit each of the UNACK messages by referring to information on a time when each of the UNACK messages was transmitted and information on a current retransmission timeout (RTO) and then retransmits at least part of the UNACK messages determined as necessary to be retransmitted. Herein, the specific distributed cache server 100, if elapsed time from a point of the time when each of the UNACK messages was transmitted exceeds the current RTO, determines that their corresponding UNACK messages are required to be retransmitted.

Figure 4:
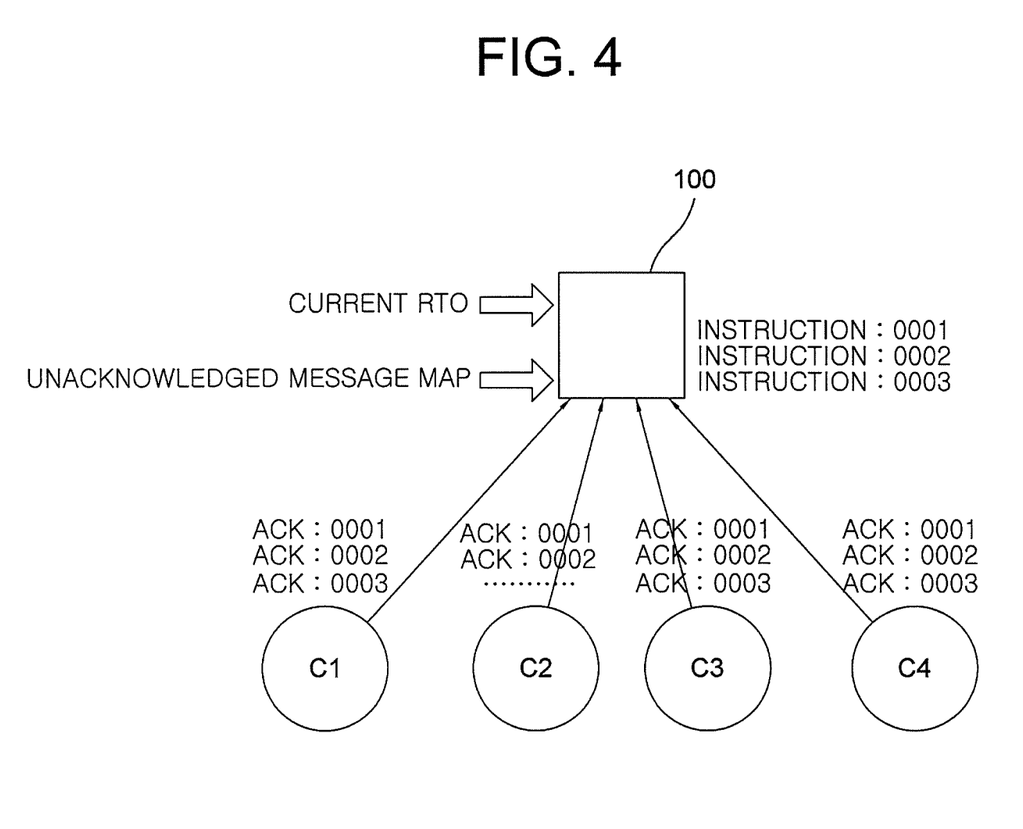
FIG. 4 is a diagram schematically illustrating a process of the multicasting method which performs retransmission in the distributed cache environment in accordance with one example embodiment of the present invention.

For example, referring to FIG. 4, the specific distributed cache server 100 sequentially transmits a plurality of instructions Instruction:0001, Instruction:0002 and Instruction:0003 by the multicast.

Then each of client nodes C1, C2, C3 and C4 receiving instructions from the specific distributed cache server 100 transmits each of ACK messages ACK:0001, ACK:0002 and ACK:0003 respectively corresponding to the instructions, and as shown in Table 1 below, the specific distributed cache server 100 checks whether the client nodes have received the instructions through ACK messages ACK:0001, ACK0002, and ACK:0003 received from each of the client nodes C1, C2, C3 and C4.

TABLE 1

| Division | C1 | C2 | C3 | C4 |
|---|---|---|---|---|
| Instruction: 0001 | ACK | ACK | ACK | ACK |
| Instruction: 0002 | ACK | ACK | ACK | ACK |
| Instruction: 0003 | ACK | . . . | ACK | ACK |

Herein, an ACK message ACK:003 or a NACK message for an Instruction:0003 is not yet received from the client node C2, and thus the specific distributed cache server 100 stores the Instruction:0003 in the unacknowledged message map as an UNACK message, then compares the point of time when the message was sent with the current RTO and, if it is determined that the reception is abnormally delayed, retransmits the message.

Hereinbefore, a case in which the distributed cache server 100 plays a role of transmitting messages through the multicasting method is explained. Hereinafter, another case in which the distributed cache server 100 plays a role of receiving messages through the multicasting method will be described by referring to FIGS. 5 to 7.

Figure 5:
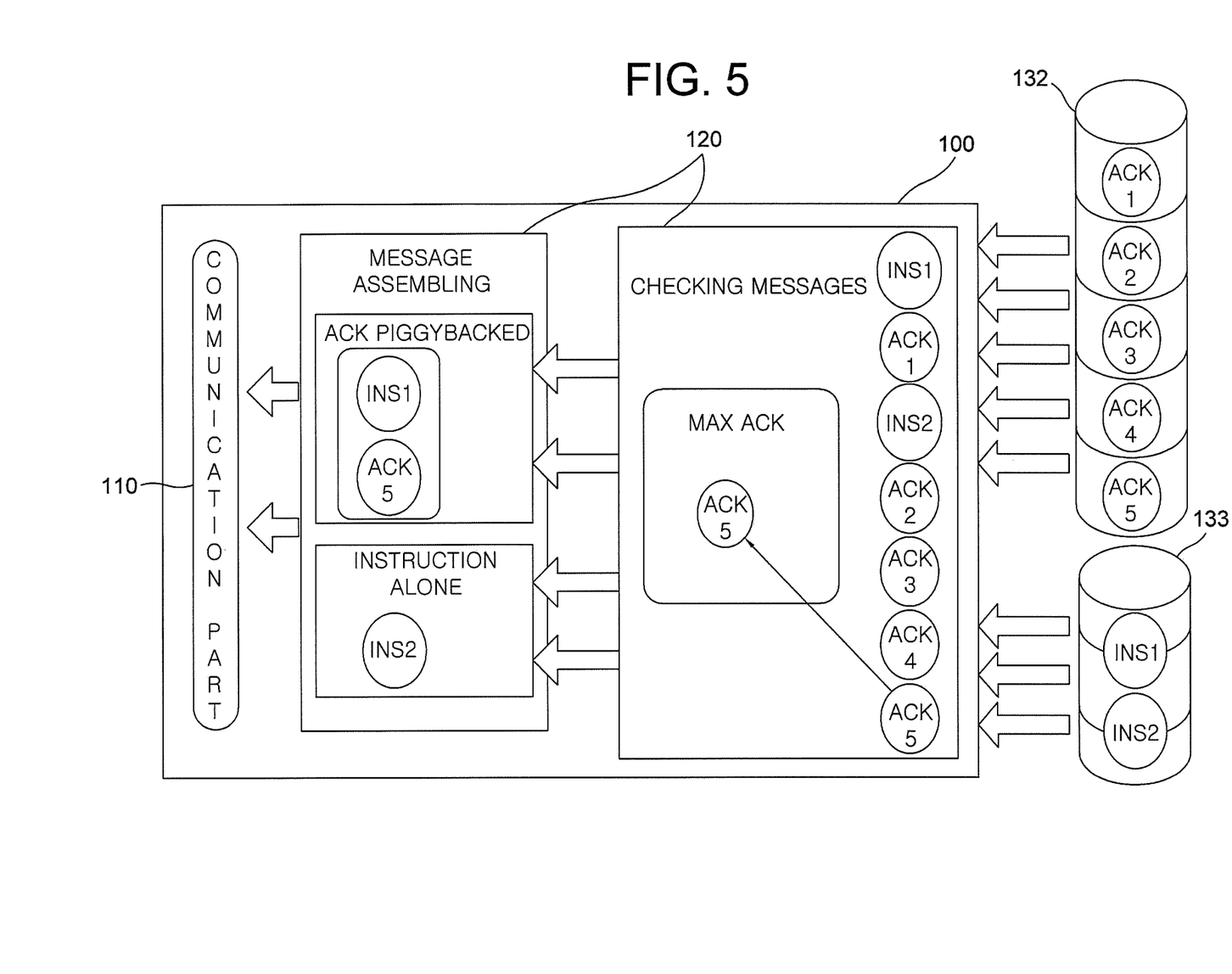
FIG. 5 is a diagram schematically illustrating a multicasting method in a distributed cache environment in accordance with another example embodiment of the present invention.

First, referring to FIG. 5, the specific distributed cache server 100 obtains certain messages transmitted from client nodes including at least one another distributed cache server through the multicast and sequentially registers ACK messages ACK1, ACK2, ACK3, ACK4 and ACK5 for transmitting a confirmation as to a reception of the certain messages to the client nodes in their corresponding ACK message queues 132 and manages the registered ACK messages.

Herein, FIG. 5 illustrates only one ACK message queue 132 for the convenience of explanation and the ACK message queue 132 includes messages to be transmitted to one client node corresponding thereto. Thus, if there are a plurality of client nodes, there may be their corresponding ACK message queues 132.

Further, the processor 120 of the specific distributed cache server 100 checks messages to be replied. Herein, the messages to be replied may include ACK messages ACK1, ACK2, ACK3, ACK4 and ACK5 registered in the message queue 132 and instruction messages INS1 and INS2 registered in at least one instruction message queue 133. In detail, the ACK messages and the instruction messages may be arranged in the order of the instruction message INS1, the ACK message ACK1, the instruction message INS2, the ACK message ACK2, the ACK message ACK3, the ACK message ACK4 and the ACK message ACK5 according to the relative order to be replied.

Thereafter, the specific distributed cache server 100 (i) identifies the specific ACK message ACK5 having the largest message number for its corresponding client node among the ACK messages registered in the ACK message queue 132 and (ii) transmits the identified specific ACK message ACK5 to its corresponding client node and automatically determines that the ACK messages ACK1, ACK2, ACK3 and ACK4 having a message number smaller than a message number of the specific ACK message ACK5 have been acknowledged. Similarly, if there is another ACK message queue 132, the specific distributed cache server 100 (i) identifies a specific ACK message ACKn having the largest message number for its corresponding another client node among ACK messages registered in said another ACK message queue 132 and (ii) transmits the identified specific ACK message ACKn to said another client node and automatically determines that other ACK messages, e.g., ACK1, ACK2, . . . , ACK(n−1), having a message number smaller than a message number of the specific ACK message ACKn have been acknowledged.

That is, if all the messages in the ACK message queues 132 are transmitted by the multicast, the network workload may rapidly increase, and in order to minimize the side effect of such a rapid increase, the specific distributed cache server 100 (i) identifies each of specific ACK messages having each largest message number for each of the client nodes among the ACK messages registered in each of the ACK message queues and (ii) transmitting each of the identified specific ACK messages to each of the corresponding client nodes and automatically determining that at least part of ACK messages, in each of the ACK message queues corresponding to each of the client nodes, having a message number smaller than each message number of each of the specific ACK messages have been confirmed.

Herein, the processor 120 of the specific distributed cache server 100 may transmit each of new messages for each of the client nodes by a piggyback scheme. For example, when the specific distributed cache server transmits a new message INS1 for its corresponding client node, the processor 120 may allow a specific ACK message ACK5 to be included in the new message INS1 by a message assembling.

In detail, by referring to FIG. 5, on condition that the relative order to be replied is determined, as the instruction message INS1, the ACK message ACK1, the instruction message INS2, the ACK message ACK2, the ACK message ACK3, the ACK message ACK4 and the ACK message ACK5, when the instruction message INS1 is transmitted, the ACK message ACK5 included in the instruction message INS1 is also transmitted by the piggyback scheme, and then instruction message INS2 is transmitted.

Figure 6:
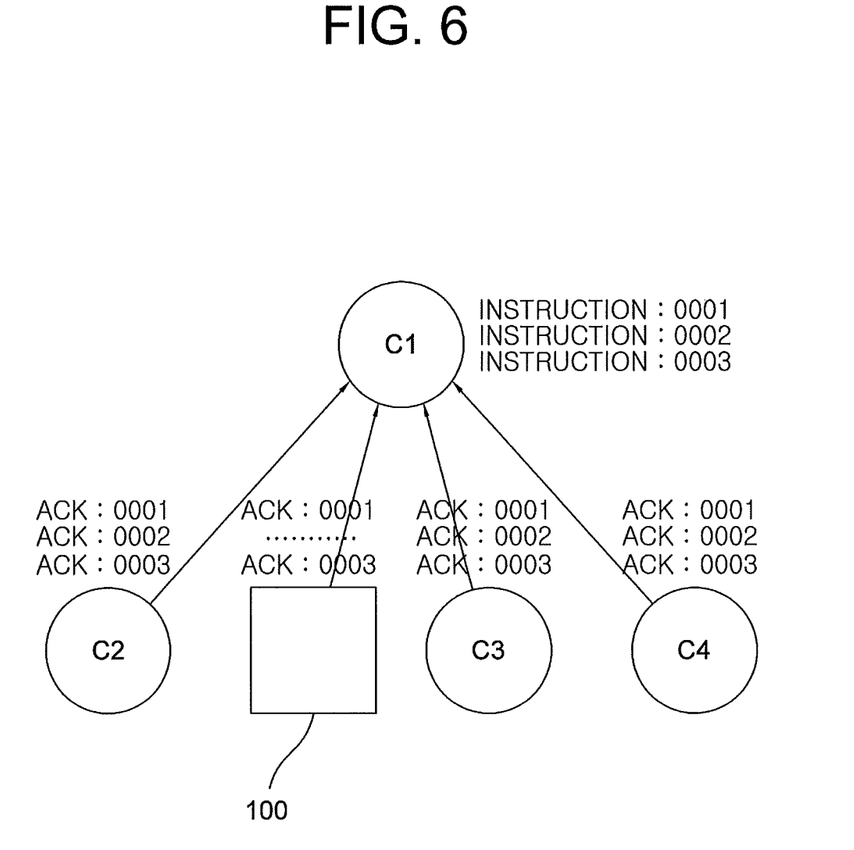
FIG. 6 is a diagram schematically illustrating a process of the multicasting method which transmits a NACK message in the distributed cache environment in accordance with another example embodiment of the present invention.

Next, as shown in FIG. 6, as a result of checking each of the ACK messages, to be transmitted to a specific client node, registered in each of the ACK message queues, if a message number ACK:0002 of a specific ACK message is detected as not included in a specific ACK message queue for a predetermined waiting time, the specific distributed cache server 100 transmits a NACK message corresponding to the specific ACK message with the message number ACK:0002 to the specific client node C1.

Namely, in order to secure a reliability of the multicast in the distributed cache environment, a message sequence at the transmitting side should be synchronized with a message sequence at the receiving side. Thus, when there is a reversal in the message numbers at the receiving side, after the predetermined waiting time, it is regarded as a loss and thus retransmission for the lost message is requested by sending the NACK message to the transmitting side.

Figure 7:
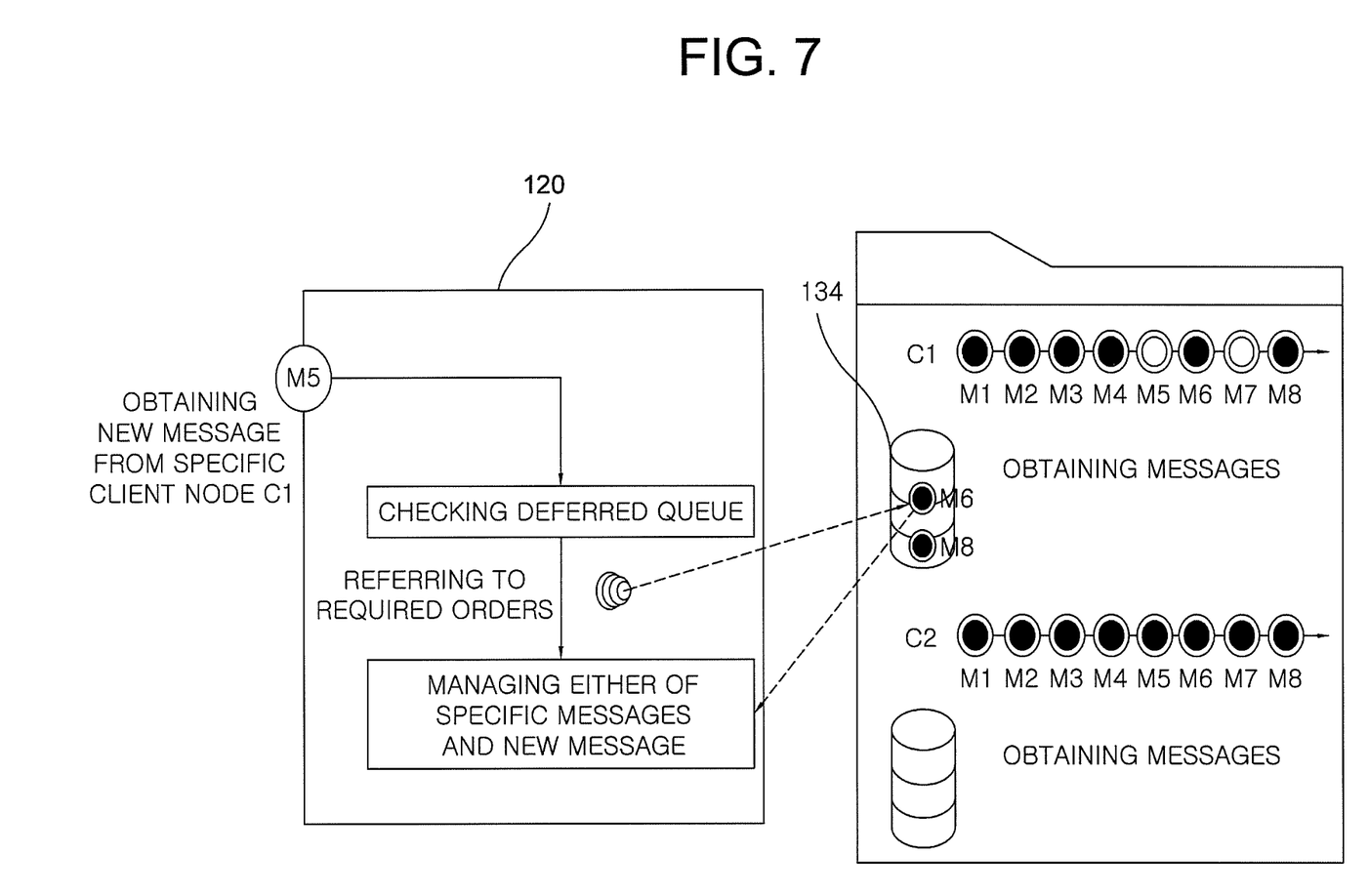
FIG. 7 is a diagram schematically illustrating a process of the multicasting method which manages a message arrived earlier than a required order of the message to be arrived in the distributed cache environment in accordance with another example embodiment of the present invention.

Next, referring to FIG. 7, as a result of checking the obtained certain messages, (i) if each of specific messages M6 and M8 obtained from the specific client node C1 is determined as arrived earlier than its corresponding required order to be arrived, the specific distributed cache server 100 registers each of the specific messages M6 and M8 in a deferred message queue 134 and (ii) if a new message M5 is obtained from the specific client node C1, the specific distributed cache server 100 manages either of the specific messages and the new message M5 by referring to the required orders of the specific messages M6 and M8 in the deferred message queue 134 and a required order of the new message M5.

Namely, in order to secure a reliability of the multicast in the distributed cache environment, the specific distributed cache server 100 on the receiving side manages information related to the transmitting side, and stores information on a message, arrived earlier than the required order of the message to be arrived, in the deferred queue, then checks the deferred queue whenever receiving a new message. Accordingly, if the new message M5 and another new message M7 are received, the specific distributed cache server 100 may process the messages M5, M6, M7, M8 according to the order of "M5→M6→M7→M8" and then remove the information on the messages M5, M6, M7, M8 from the deferred queue.

The present invention has an effect of minimizing the number of transmitting the ACK messages.

The present invention has another effect of reducing the network load and minimizing the use of computing resources through an efficient management of the ACK messages, resulting in the quick and stable multicast.

The present invention has still another effect of allowing quick and stable cache data control based on the multicast protocol through minimization of transmitting the ACK messages, adaptive retransmission, simultaneous transmission of the multicast instruction message and the ACK message The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A multicasting method in a distributed cache environment, comprising steps of:
   (a-i) transmitting, by a specific distributed cache server among a plurality of distributed cache servers in the distributed cache environment, certain messages to client nodes through multicast, the client nodes including at least one another distributed cache server among the plurality of distributed cache servers in the distributed cache environment;
   (a-ii) sequentially registering, by the specific distributed cache server in an unacknowledged message map thereof, UNACK messages representing messages without their corresponding ACK messages from their corresponding client nodes;
   (a-iii) checking, by the specific distributed cache server, if receiving a specific ACK message from one of the client nodes, whether the unacknowledged message map includes a specific UNACK message corresponding to the specific ACK message among the UNACK messages and, if the unacknowledged message map is determined as including the specific UNACK message, deleting the specific UNACK message from the unacknowledged message map;
   (b-i) checking, by the specific distributed cache server, the number of the UNACK messages registered in the unacknowledged message map; and
   (b-ii) stopping, by the specific distributed cache server, transmission of additional messages to the client nodes through the multicast when the number reaches a first predetermined number,
   wherein, at the step of (a-iii), the specific distributed cache server automatically determines at least part of UNACK messages as acknowledged and deletes the at least part of UNACK messages in the unacknowledged message map, wherein the deleted at least part of UNACK messages correspond to at least part of ACK messages having a number smaller than the number of the specific ACK message corresponding to the specific UNACK message.

2. The method of claim 1, further comprising a step of:
   (a-iv) checking, by the specific distributed cache server, whether to retransmit each of the UNACK messages by referring to information on a time when each of the UNACK messages was transmitted and information on a current retransmission timeout (RTO) and then retransmitting at least part of the UNACK messages determined as necessary to be retransmitted.

3. The method of claim 2, wherein the specific distributed cache server, if elapsed time from a point of the time when each of the UNACK messages was transmitted exceeds the current RTO, determines that their corresponding UNACK messages are required to be retransmitted.

4. A multicasting method in a distributed cache environment, comprising steps of:
   (a-i) obtaining, by a specific distributed cache server among a plurality of distributed cache servers in the distributed cache environment, certain messages transmitted from client nodes through multicast, the client nodes including at least one another distributed cache server among the plurality of distributed cache servers in the distributed cache environment;
   (a-ii) sequentially registering, by the specific distributed cache server, ACK messages in ACK message queues, the ACK messages for transmitting a confirmation as to a reception of the certain messages to the client nodes, wherein each of the ACK message queues corresponds to one of the client nodes;
   (a-iii) managing, by the specific distributed cache server, the registered ACK messages;
   (a-iv) as a result of checking the obtained certain messages, registering, by the specific distributed cache server if a specific message obtained from a specific client node is determined as arrived earlier than a required order of the specific message to be arrived, the specific message in a deferred message queue;
   (a-v) as a result of checking the obtained certain messages, managing, by the specific distributed cache server if a new message is obtained from the specific client node, either of the specific message and the new message by referring to the required order of the specific message in the deferred message queue and a required order of the new message;
   (b-i) identifying, by the specific distributed cache server, a specific ACK message in each of the ACK message queues having a largest message number for the corresponding client node;
   (b-ii) transmitting, by the specific distributed cache server, each of the identified specific ACK messages to each of the corresponding client nodes and
   (b-iii) automatically determining, by the specific distributed cache server, that at least one other ACK, message in each of the ACK message queues have been confirmed, wherein the at least one other ACK message in each of the ACK message queues has a message number smaller than each of message numbers of each of the identified specific ACK messages in each of the ACK message queues.

5. The method of claim 4, wherein, at the step of (b-ii), each of the specific ACK messages are included in a new message, and the specific distributed cache server transmits each of the new messages for each of the client nodes by a piggyback scheme.

6. The method of claim 4, further comprising a step of:
(b-iv) transmitting, by the specific distributed cache server as a result of checking each of the ACK messages, to be transmitted to a specific client node, registered in each of the ACK message queues and detecting a specific message number of a specific ACK message as not included in a specific ACK message queue for a predetermined waiting time, a NACK message for the specific ACK message to the specific client node.

7. A specific distributed cache server for performing multicast in a distributed cache environment, comprising:
a communication part for transmitting certain messages to client nodes through multicast, the client nodes including at least one another distributed cache server among the plurality of distributed cache servers in the distributed cache environment; and
a processor for performing processes of:
(I) sequentially registering, in an unacknowledged message map, UNACK messages representing messages without their corresponding ACK messages from their corresponding client nodes;
(II) checking, if a specific ACK message is received from one of the client nodes, whether the unacknowledged message map includes a specific UNACK message corresponding to the specific ACK message among the UNACK messages and, if the unacknowledged message map is determined as including the specific UNACK message, deleting the specific UNACK message from the unacknowledged message map;
(III) checking the number of the UNACK messages registered in the unacknowledged message map; and
(IV) stopping transmission of additional messages to the client nodes through the multicast when the number reaches a first predetermined number,
wherein, at the process of (I), the processor automatically determines at least part of UNACK messages as acknowledged and deletes the at least part of UNACK messages in the unacknowledged message map, wherein the deleted at least part of UNACK messages correspond to at least part of ACK messages having a number smaller than the number of the specific ACK message corresponding to the specific UNACK message.

8. The specific distributed cache server of claim , wherein the process of (I) includes a process of: checking whether to retransmit each of the UNACK messages by referring to information on a time when each of the UNACK messages was transmitted and information on a current retransmission timeout (RTO) and then retransmitting at least part of the UNACK messages determined as necessary to be retransmitted.

9. The specific distributed cache server of claim 8, wherein the processor, if elapsed time from a point of the time when each of the UNACK messages was transmitted exceeds the current RTO, determines that their corresponding UNACK messages are required to be retransmitted.

10. A specific distributed cache server for performing a multicast method in a distributed cache environment, comprising:
a communication part for obtaining certain messages transmitted from client nodes through multicast, the client nodes including at least one another distributed cache server among the plurality of distributed cache servers in the distributed cache environment; and
a processor for performing processes of:
(I) sequentially registering ACK messages in ACK message queues, the ACK messages for transmitting a confirmation as to a reception of the certain messages to the client nodes, wherein each of the ACK message queues corresponds to one of the client nodes, and managing the registered ACK messages, and as a result of checking the obtained certain messages:
(i) if a specific message obtained from a specific client node is determined as arrived earlier than a required order of the specific message to be arrived, registering the specific message in a deferred message queue, and
(ii) if a new message is obtained from the specific client node, managing either of the specific message and the new message by referring to the required order of the specific message in the deferred message queue and a required order of the new message; and
(II) (i) identifying a specific ACK message in each of the ACK message queues having a largest message number for the corresponding client node, and (ii) transmitting each of the identified specific ACK messages to each of the corresponding client nodes and automatically determining that at least one other ACK message in each of the ACK message queues have been confirmed, wherein the at least one other ACK message in each of the ACK message queues has a message number smaller than each of message numbers of each of the identified specific ACK messages in each of the ACK message queues.

11. The specific distributed cache server of claim 10, wherein, at the process of (II), each of the specific ACK messages are included in a new message, and the processor transmits each of the new messages for each of the client nodes by a piggyback scheme.

12. The specific distributed cache server of claim 10, wherein, at the process of (II), as a result of checking each of the ACK messages, to be transmitted to a specific client node, registered in each of the ACK message queues, if a specific message number of a specific ACK message is detected as not included in a specific ACK message queue for a predetermined waiting time, the communication part transmits a NACK message for the specific ACK message to the specific client node.

* * * * *